(12) United States Patent
Benthien

(10) Patent No.: US 8,777,162 B2
(45) Date of Patent: Jul. 15, 2014

(54) CONNECTING ROD FOR THE STRUCTURAL REINFORCEMENT OF A FUSELAGE STRUCTURE OF AN AIRCRAFT

(75) Inventor: Hermann Benthien, Sottrum (DE)

(73) Assignee: Airbus Operations GmbH, Hamburg (DE)

( * ) Notice: Subject to any disclaimer, the term of this patent is extended or adjusted under 35 U.S.C. 154(b) by 990 days.

(21) Appl. No.: 11/999,260

(22) Filed: Dec. 4, 2007

(65) Prior Publication Data
US 2010/0096506 A1   Apr. 22, 2010

Related U.S. Application Data

(60) Provisional application No. 60/874,594, filed on Dec. 13, 2006.

(30) Foreign Application Priority Data

Dec. 8, 2006  (DE) .......................... 10 2006 058 377

(51) Int. Cl.
B64C 1/06   (2006.01)

(52) U.S. Cl.
USPC ........................................................ 244/131

(58) Field of Classification Search
USPC ........... 244/117 R, 118.1, 129.1, 118.2, 131, 244/133, 119; 74/594, 594.1, 579 R, 586
See application file for complete search history.

(56) References Cited

U.S. PATENT DOCUMENTS

| | | | | |
|---|---|---|---|---|
| 4,183,261 A | * | 1/1980 | Eiselbrecher et al. | 74/579 R |
| 4,414,860 A | * | 11/1983 | Brunsch et al. | 74/579 E |
| 4,546,669 A | * | 10/1985 | Fischer et al. | 74/579 E |
| 5,690,034 A | * | 11/1997 | Schahl et al. | 105/199.1 |
| 6,324,940 B1 | * | 12/2001 | Pazdirek et al. | 74/579 R |
| 7,159,880 B2 | * | 1/2007 | Budde et al. | 280/124.128 |
| 7,926,761 B2 | * | 4/2011 | Coupe et al. | 244/102 R |
| 8,024,993 B2 | * | 9/2011 | Dal Pra et al. | 74/594.1 |
| 2010/0031509 A1 | | 2/2010 | Frauen et al. | |

FOREIGN PATENT DOCUMENTS

| | | |
|---|---|---|
| DE | 10060042 | 6/2002 |
| DE | 102005002370 | 7/2006 |
| DE | 102005054869 | 5/2007 |

OTHER PUBLICATIONS

German Office Action from DE 10 2006 058 377.9 dated Aug. 13, 2008.

* cited by examiner

*Primary Examiner* — Valentina Xavier

(74) *Attorney, Agent, or Firm* — Jenkins, Wilson, Taylor & Hunt, P.A.

(57) ABSTRACT

A connecting rod for the structural reinforcement of a fuselage structure of an aircraft includes a shank and eyes arranged at the shank ends on both sides for connecting the connecting rod to the fuselage structure. The connecting rod may have a reinforcing arrangement, which is configured as an all-over casing, the casing being formed by mechanically high-strength reinforcing fibers. The casing may also be formed by reinforcing fiber strands, which for their part can include a multiplicity of discrete reinforcing fibers running parallel to one another. Carbon fibers, glass fibers, aramid fibers and high-strength ceramic fibers come into consideration in particular as reinforcing fibers.

13 Claims, 5 Drawing Sheets

CONNECTING ROD FOR THE STRUCTURAL REINFORCEMENT OF A FUSELAGE STRUCTURE OF AN AIRCRAFT

CROSS-REFERENCE TO RELATED APPLICATIONS

This application claims the benefit of U.S. Provisional Application No. 60/874,594, filed Dec. 13, 2006 and German Patent Application No. 10 2006 058 377.9, filed Dec. 8, 2006, the entire disclosures of which are herein incorporated by reference.

FIELD OF THE INVENTION

The invention relates to a connecting rod for the structural reinforcement of a fuselage structure of an aircraft comprising a shank and eyes arranged at shank ends on both sides for connecting the connecting rod to the fuselage structure. Such rods may also be known as "Samer rods".

BACKGROUND OF THE INVENTION

Known embodiments of connecting rods are formed by a metallic material. Alternatively, the connecting rod may also be constructed with a fiber-reinforced plastics material. Among the purposes for which connecting rods serve in aircraft construction is that of mechanically supporting the floor structure or connecting the same to the fuselage structure, that is to say in particular to the ring frames. During normal operation, the connecting rods are exposed to the loads normally occurring during flight. In the event of an accident of the aircraft, however, the connecting rods have to withstand loads far beyond the normal flight loads. In particular in the direction of flight, the ratio between crash loads and general flight loads is very high, in the direction of flight approximately 1 to 4.

Accordingly, the known connecting rods are designed with respect to their mechanical load-bearing capacity for the loads occurring in the worst case, that is to say in particular the crash loads or accident loads. As a result, the known connecting rods are overdimensioned for normal flight operation, resulting in unnecessary extra weight in this flight condition.

Pure crash loads are absorbed in crash nets of very low weight with plastic cables. However, these are stretched far more under load than a rigid solution. Under a crash load, the deformations may of course be much greater.

SUMMARY OF THE INVENTION

An object of the invention is to provide a connecting rod which has a lower mass in comparison with the previously known configurational variants, since it meets the requirements both under normal flight conditions and in the case of a crash optimally in terms of weight.

The fact that the eyes are connected by means of a reinforcing arrangement which is formed by a multiplicity of reinforcing fibers, and both eyes have a groove in order to ensure an adequate mechanical load-bearing capacity of the connecting rod in an accident situation, means that the connecting rod according to the invention has an adequate mechanical load-bearing capacity in all flight conditions, including the accident situation (crash case). The connecting rod according to the invention may be understood in static terms almost as a combination of a traction cable (only tensile forces) with a conventional connecting rod (tensile and compressive forces).

The reinforcing arrangement provided according to the invention may be formed in a first configurational variant as a casing which encloses substantially completely the shank and the threaded rod with the eyes arranged on it. In this case, the eyes arranged at both ends of the connecting rod respectively have a peripheral, concavely formed groove, in order to ensure reliable guidance of the casing formed by a multiplicity of reinforcing fibers. The cross-sectional geometry of the concave groove is chosen here such that the reinforcing fibers or reinforcing fiber strands placed in follow the ideal geometrical line, that is say enclose the eye over the shortest path and at the same time ensure a material thickness of the casing that is as uniform as possible.

The casing may be formed by high-strength reinforcing fibers, which are woven together, braided or arranged one over the other in layers in a suitable way to create a self-contained enclosure.

Alternatively or in addition, the casing may be formed by reinforcing fiber strands which for their part are formed by a multiplicity of discrete reinforcing fibers running parallel to one another (filaments), the reinforcing fiber strands being woven together to form a self-contained, tube-like (hose-like) casing. The weaving or braiding is performed by alternately placing the reinforcing fiber strands over and under one another.

Led around the eyes of the connecting rod are individual discrete stranded reinforcing fibers or multiple reinforcing fiber strands, which are mechanically incorporated in the casing in order to be able to introduce the tensile forces that can act in the region of the eyes into the reinforcing fiber casing of the shank of the connecting rod. The concavely formed peripheral grooves in both eyes arranged at the ends of the connecting rod produce the effect of secure lateral guidance of the reinforcing fibers or the reinforcing fiber strands. The reinforcing fiber casing may be formed by an endless (continuous) reinforcing fiber or an endless reinforcing fiber strand "seamlessly" in one piece. Alternatively, the casing may be produced by more than one reinforcing fiber or reinforcing fiber strand. In the latter case, the reinforcing fibers or reinforcing fiber strands are suitably connected to one another if the frictional forces between the reinforcing fibers within the woven casing do not ensure an adequate mechanical load-bearing capacity.

Furthermore, the casing may be formed by a tube-like woven fabric of reinforcing fibers and/or reinforcing strands. The tube-like fabric is cut to length to a size corresponding to the connecting rod, one end of the fabric in each case being led around an eye of the connecting rod and suitably fixed, in order to form a self-contained and mechanically tension-resistant casing.

The casing of the connecting rod may be under mechanical prestress (prestrain), in order that in the case of a crash the crash load occurring if the shank of the connecting rod fails can be taken over without any delay.

As high-strength reinforcing fibers, it is possible to use carbon fibers, glass fibers, aramid fibers and ceramic fibers or any desired combination of these.

In a further configurational variant, it is provided that the reinforcing arrangement is formed by at least one endless cable running around the eyes. The cable is in turn formed by the reinforcing fibers and/or the reinforcing fiber strands and is likewise under mechanical prestress. In addition to the concave grooves that are present in the eyes in this case too, to guide the cable corresponding grooves that form a continuous groove enclosing the connecting rod may be provided in the shank and in the shank ends of the connecting rod.

The connecting rod itself may be at least partially formed by a metallic material, for example a high-strength aluminium alloy, or at least partially by a composite material. Carbon-fiber-reinforced epoxy resins in particular come into consideration here as a composite material. The geometric form of the connecting rod is dependent on the load cases occurring. For example, the middle portion of the connecting rod may have a greater diameter than the eyes at the ends.

The fact that the eyes are connected by means of a reinforcing arrangement, the reinforcing arrangement being arranged within the shank in order to ensure an adequate mechanical load-bearing capacity of the connecting rod in an accident situation, allows high tensile forces to be absorbed by the connecting rod in a crash situation. The internally running reinforcing arrangement ensures a compact construction of the connecting rod and at the same time offers good protection of the reinforcing arrangement from external influences.

BRIEF DESCRIPTION OF THE DRAWINGS

In the figures, the same structural elements have in each case the same reference numerals.

DETAILED DESCRIPTION OF THE INVENTION

Figure 1:
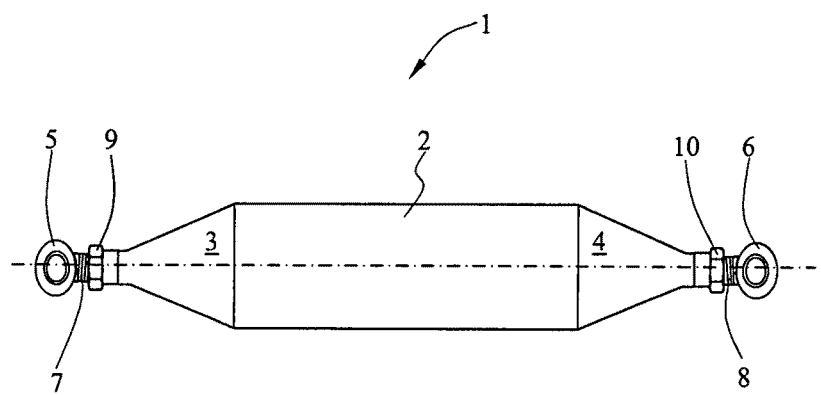
FIG. 1 shows a plan view of a connecting rod without a reinforcing arrangement.

FIG. 1 shows the connecting rod according to the invention, initially without the reinforcing arrangement for the sake of a better overview.

A connecting rod 1 has a substantially (hollow)-cylindrically formed shank 2 (middle portion), which is respectively adjoined on both sides by a frustoconical shank end 3, 4. On the shank ends 3, 4, an eye 5, 6 can respectively be screwed on by threaded bolts 7, 8 for length compensation. The eyes 5, 6 may be integral parts of the connecting rod 1. The eyes 5, 6 have a peripheral groove with a concave cross-sectional geometry for precise lateral guidance (perpendicularly to the plane of the drawing) of the reinforcing arrangement (not represented in FIG. 1) in the region of the eyes 5, 6 (cf. FIG. 2). The eyes 5, 6 form as it were in each case an end "eyelet" for the reinforcing arrangement. Prevention against unintentional turning of the threaded bolts 7, 8 provided with the eyes 5, 6 is obtained by lock nuts 9, 10. The mechanical connection to the load-bearing structure of the fuselage cell of an aircraft takes place by means of the eyes 5, 6. For example, loads acting on the floor structure are transferred by connecting rods to the ring frames in the load-bearing structure of the fuselage cell of an aircraft.

Figure 2:
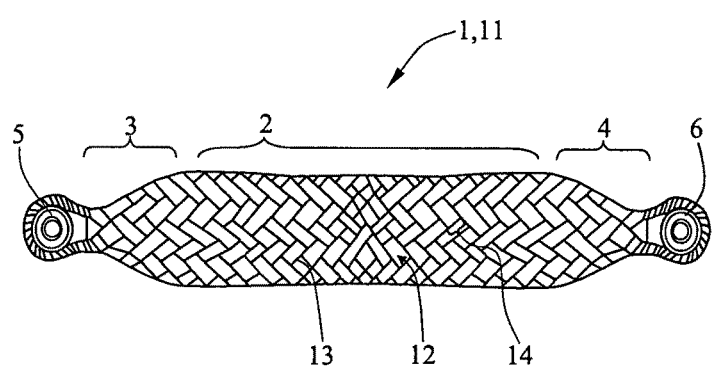
FIG. 2 shows a plan view of the connecting rod with a fiber casing.

FIG. 2 shows the connecting rod with a reinforcing arrangement formed as a braided or woven casing.

The connecting rod 1 has a reinforcing arrangement 11, which in this configurational variant is configured as a continuous casing 12 or enclosure, which is formed by high-strength reinforcing fibers 13. The casing 12 here encloses the shank 2, the shank ends 3, 4, and the eyes 5, 6.

However, preferably no individual, discrete reinforcing fibers 13 are used for producing the casing 12, but instead at least one endless, continuous reinforcing fiber strand 14, which for its part is formed by a multiplicity of discrete reinforcing fibers respectively running parallel to one another (so-called "rovings", "tape"), is used to form the casing 12. If the casing 12 is formed by only one continuous, "endless" reinforcing fiber strand 14, a seamlessly woven, tube-like or hose-like casing 12 is obtained.

For reinforcement, further reinforcing fiber strands 14 or reinforcing fibers 13 may be placed around the eyes 5, 6, and are then firmly incorporated mechanically in the casing 11, for example by weaving them in or in some other way. As a result, an optimum force transfer of tensile forces is achieved between the eyes 5, 6 over the connecting rod 1.

The reinforcing fibers 13 or the reinforcing fiber strands 14 may, for example, be formed by carbon fibers, glass fibers and high-strength aramid fibers. If appropriate, the reinforcing fibers may be additionally impregnated with a curable thermosetting synthetic resin material for positional fixing. The casing 12 may alternatively be formed by a prefabricated, tube-like woven fabric of reinforcing fibers 13 or reinforcing fiber strands 14, which is pulled onto the connecting rod 1. The casing is preferably under mechanical prestress, in order in the case of mechanical failure of the shank 2 of the connecting rod 1 or other parts to be able immediately to absorb the tensile loads occurring in the case of a crash without prior stretching.

On account of the casing 12 formed by high-strength reinforcing fibers 13, the connecting rod 1 can be dimensioned to be weaker in static terms, so that a considerable weight saving is obtained. The mechanically lighter design of the connecting rod 1 according to the invention is possible because it only absorbs the flight loads occurring in normal flight operation, while in the case of a serious crash the considerable mechanical accident loads then acting in the direction of flight in particular are substantially borne by the casing 12, formed by a multiplicity of high-strength reinforcing fibers 13.

Figure 3:
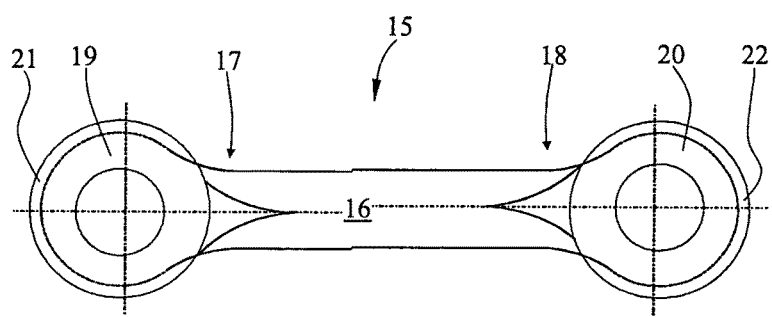
FIG. 3 shows a plan view of a first configurational variant of the connecting rod without a casing.
Figure 4:
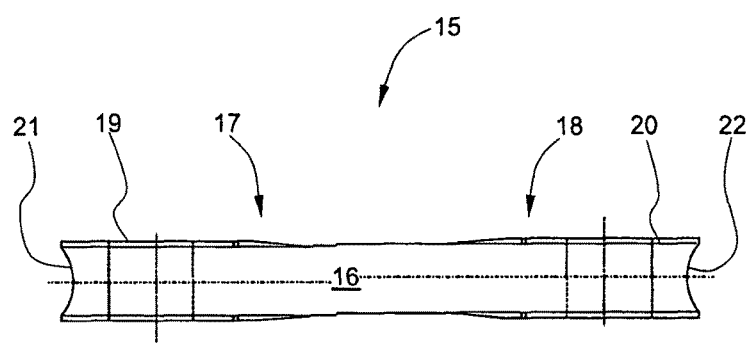
FIG. 4 shows a side view of the first configurational variant of the connecting rod without a casing.

FIGS. 3 and 4 show a first configurational variant of the connecting rod according to the invention in a plan view and in a side view. As a difference from the configurational variant according to FIGS. 1, 2, the eyes are an integral part of the connecting rod, so that tolerance compensation is not possible.

A connecting rod 15 has a shank 16, two shank ends 17, 18 and two eyes 19, 20, arranged at the shank ends 17, 18. The eyes 19, 20 respectively have a concavely formed groove 21, 22, in which the reinforcing arrangement (not represented in FIGS. 3, 4) is guided in the region of the eyes. If the shank 16 has a greater diameter in comparison with the eyes 19, 20, longitudinal grooves may be provided in the shank 16 for guiding or partially receiving the reinforcing arrangement. The grooves 21, 22 may also have a semicircular cross-sectional geometry.

Figure 5:
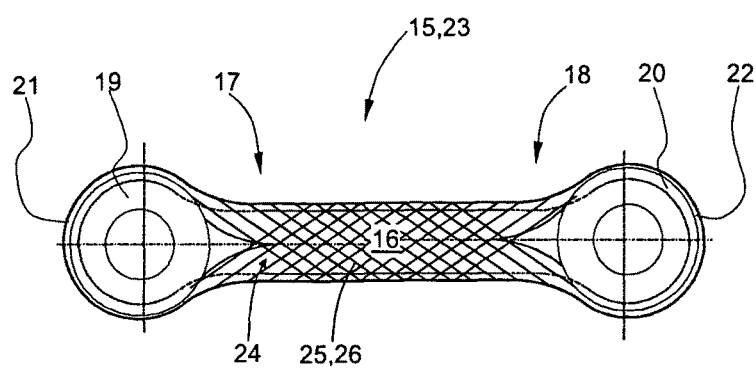
FIG. 5 shows a plan view of the first configurational variant of the connecting rod with the casing.
Figure 6:
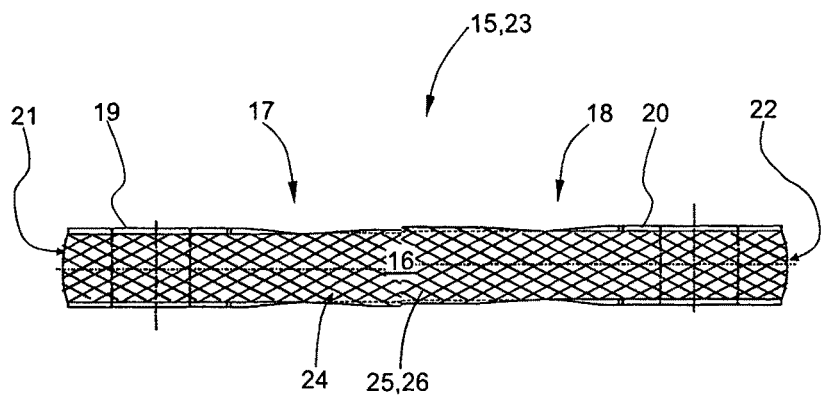
FIG. 6 shows a side view of a first configurational variant of the connecting rod with the casing.

FIGS. 5 and 6 show the first configuration of the connecting rod 15 with applied reinforcing arrangement in a plan view and a side view.

In the exemplary embodiment shown, a reinforcing arrangement 23 is formed as a casing 24. The casing 24 encloses the shank 16, the shank ends 17, 18 and the eyes 19, 20. The casing 24 is formed by a multiplicity of individual, discrete reinforcing fibers 25, which are grouped together to form reinforcing fiber strands 26. Alternatively, the casing 24 may be formed by a tube-like woven fabric, which encloses the connecting rod 15 and the ends of which are brought together in the region of the eyes 19, 20 to form a substantially self-contained casing 24. It is decisive that the reinforcing fibers 25 or the reinforcing fiber strands 26 are woven with one another in order to ensure that they are adequately held together. In FIG. 5 it can be seen that the reinforcing fibers 25 or the reinforcing fiber strands 26, guided by the concave grooves 21, 22, are wrapped around the eyes 19, 20. The concave grooves 21, 22 here ensure exact lateral guidance of the reinforcing fibers 25 or the reinforcing fiber strands 26 perpendicularly to the plane of the drawing.

Figure 7:
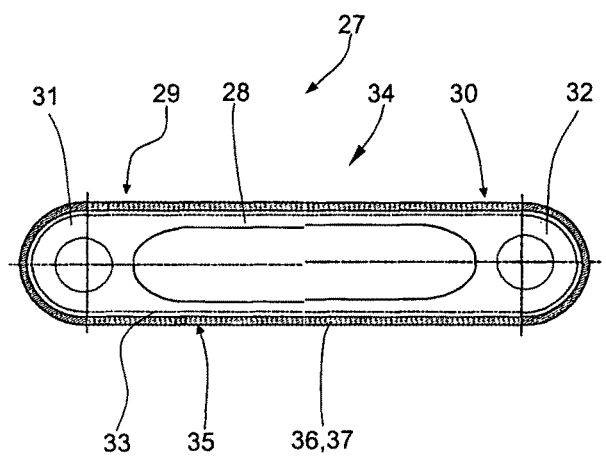
FIG. 7 shows a plan view of a second configurational variant of the connecting rod with an endless cable.
Figure 8:
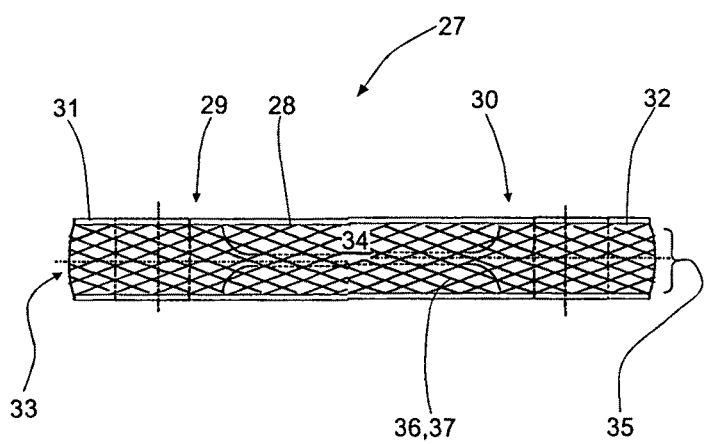
FIG. 8 shows a side view of the second configurational variant of the connecting rod.

FIGS. 7 and 8 show a second configurational variant of a connecting rod in a plan view and a side view. The main difference from the previous configurational variants is that the reinforcing arrangement is not formed as a casing but with an encircling, endless cable.

A connecting rod 27 has a shank 28 with an undesignated recess. Arranged at both shank ends 29, 30 there is respectively an eye 31, 32. By contrast with the previous embodiments, the connecting rod 27 has a width that is almost constant over the entire length. The shank 28, the shank ends 29, 30 and the eyes 31, 32 have a peripheral groove 33 with a concave cross-sectional geometry. A reinforcing arrangement 34 is formed in this configurational variant by an endless cable 35 that lies in the groove 33 and is constructed with a multiplicity of reinforcing fibers 36 or reinforcing fiber strands 37. The cable 35 is preferably under mechanical prestress. Adequate lateral guidance of the cable 35 is ensured by the concavely formed groove 33. Instead of the cable, the shank 28 may also have a braided-around reinforcing arrangement (cf. in particular FIGS. 2, 5, 6).

Glass fibers, carbon fibers, aramid fibers, ceramic fibers or other high-strength reinforcing fibers of an organic or metallic nature come into consideration as reinforcing fibers or reinforcing fiber strands to form the reinforcing arrangement for all the configurational variants of the connecting rods described.

Figure 9:
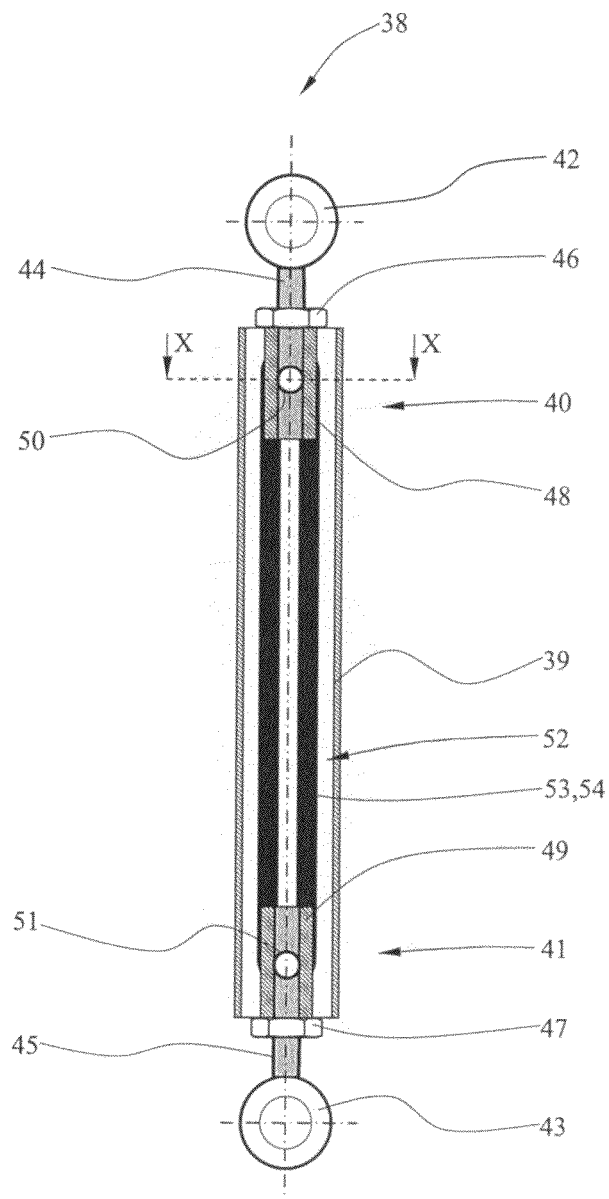
FIG. 9 shows a third configurational variant of the connecting rod with two internal endless cables.

FIG. 9 shows a third configurational variant of a connecting rod in a sectioned side view with two internal cables to form the reinforcing arrangement.

A connecting rod 38 comprises, inter alia, a hollow-cylindrical shank 39. In the region of shank ends 40, 41, the eyes 42, 43 are screwed in by means of the threaded bolts 44, 45. The threaded bolts 44, 45 are secured by the lock nuts 46, 47. By contrast with the previous configurational variants, the cross-sectional geometry of the connecting rod 38 is constant over the entire extent of its length. The threaded bolts 44, 45 are respectively screwed into a guiding block 48, 49 or a threaded insert. In the exemplary embodiment shown in FIG. 9, the guiding blocks 48, 49 are fastened by way of example by means of a screw connection 50, 51 in the shank ends 40, 41 of the connecting rod 38. A length adjustment of the connecting rod 38 is possible by screwing the threaded bolts 44, 45 into the guiding blocks 48, 49. Running around the two guiding blocks 48, 49 is a reinforcing arrangement 52, which may be formed by at least two endless cables 53, 54 from a multiplicity of woven together, stranded and/or spliced, mechanically highly load-bearing fibers. The connecting rod 38 represented in FIG. 9 is suitable for tensile forces, in particular crash loads, of up to 50 kN.

Figure 10:
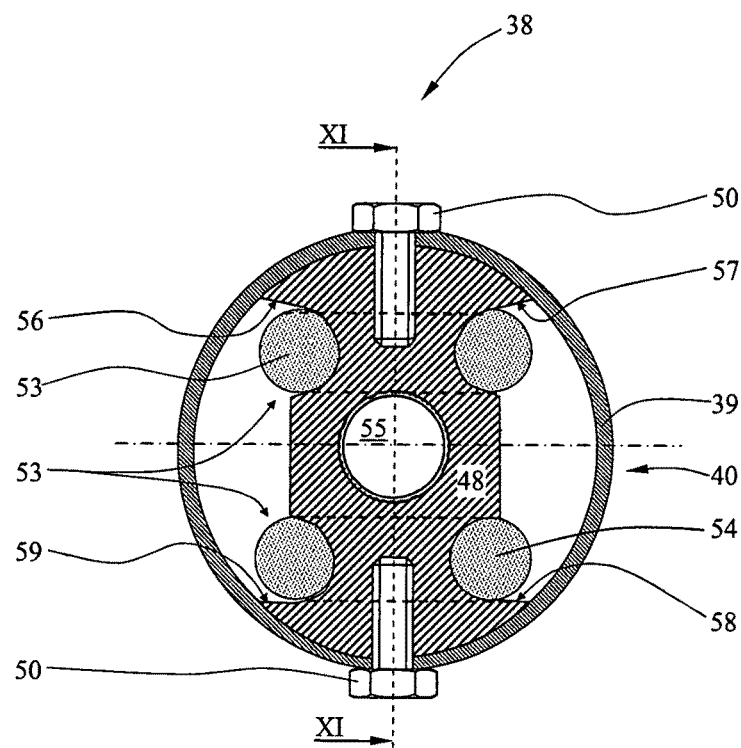
FIGS. 10-11 show two detailed views of the third configurational variant of the connecting rod.

FIG. 10 shows a cross-sectional representation in the region of the (upper) shank end 40 of the connecting rod 38 along the sectional line X-X of FIG. 9.

In the shank end 40 of the shank 39, the guiding block 48 is fastened by means of the screw connection 50. On account of the symmetry of the overall arrangement, the construction of the upper guiding block 48 corresponds to that of the lower guiding block 49. Instead of the screw connection 50 with two hexagon cap screws, the guiding block 48 may be fastened in the shank 39 of the connecting rod 38 by other fastening means. For example, the guiding block 48 may alternatively be fastened in the connecting rod 38 by at least two pins. The guiding block 48 also has a threaded bore 55, into which the threaded bolt 44 can be screwed to fasten the eye 42. Furthermore, the guiding block 48 has respectively two oppositely arranged grooves 56 to 59 with an in each case approximately semicircular cross-sectional geometry. The cross-sectional geometry of the grooves 56 to 59 is adapted to the cross section of the reinforcing arrangement 52 respectively used, which may for example also be formed by endless strips of a rectangular cross-sectional geometry, in order to achieve a firm seating and adequate guidance of the reinforcing arrangement 52. The grooves 56 to 59 serve for guiding the reinforcing arrangement 52, which in the exemplary embodiment shown is formed by two circulating endless cables 53, 54 of mechanically high-strength reinforcing fibers. The grooves 56 to 59 run around the periphery of the guiding block 48, but may alternatively only be introduced into portions of the guiding block 48. The reinforcing arrangement 52 serves primarily for receiving high mechanical loads in the longitudinal direction of the connecting rod 38, which occur in particular in crash situations on fuselage structures of aircraft.

Figure 11:
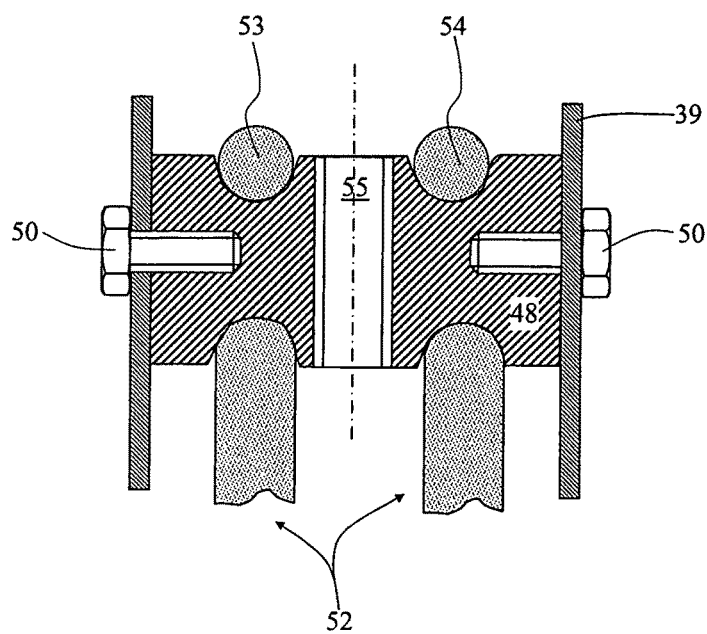

FIG. 11 shows for the purposes of illustration a cross-sectional representation in the region of the (upper) shank end 40 of the connecting rod (38) along the sectional line XI-XI in FIG. 10.

In the exemplary embodiment shown, the (upper) guiding block 48 is connected to the shank 39 by two hexagon cap screws, which together represent the screw connection 50. The cables 53, 54 of the reinforcing arrangement 52 lie in the grooves 56 to 59 and are thereby securely guided and secured against uncontrolled slipping. The threaded bore 55 extends over the entire height of the guiding block 48, in order to ensure screwing right through of the threaded bolt 44 and consequently length adjustability in a great setting range.

What is claimed is:

1. A connecting rod for the structural reinforcement of a fuselage structure of an aircraft, the connecting rod comprising a shank and eyes arranged at shank ends on both sides for connecting the connecting rod to the fuselage structure, wherein on at least one shank end an eye can be screwed on for length compensation; and a reinforcing arrangement enclosing at least in certain regions both eyes, the shank and the shank ends, wherein the eyes are connected by the reinforcing arrangement which is formed by a multiplicity of reinforcing fibers, and both eyes have a peripheral groove with a concave cross-sectional geometry for a precise lateral guidance of the reinforcing arrangement in the region of the eyes, wherein the reinforcing arrangement is formed as a casing which encloses at least in certain regions both eyes and the shank as well as the shank ends, and wherein the casing is under mechanical prestress to be able to immediately absorb tensile loads without prior stretching to ensure an adequate mechanical load-bearing capacity of the connecting rod in an accident situation.

2. The connecting rod according to claim 1, wherein the casing is formed by at least one reinforcing fiber strand, the at least one reinforcing fiber strand being woven to form a woven fabric.

3. The connecting rod according to claim 2, wherein the at least one reinforcing fiber strand is formed by a multiplicity of reinforcing fibers.

4. The connecting rod according to claim 1, wherein the reinforcing fibers are formed by carbon fibers.

5. The connecting rod according to claim 1, wherein the reinforcing fibers are formed by glass fibers.

6. The connecting rod according to claim 1, wherein the reinforcing fibers are formed by aramid fibers.

7. The connecting rod according to claim 1, wherein the reinforcing fibers are formed by ceramic fibers.

8. The connecting rod according to claim 1, wherein at least one of the shank or the shank ends are formed by a metallic material.

9. The connecting rod according to claim 1, wherein the shank and the shank ends are formed by a fiber-reinforced plastics material or a carbon-fiber-reinforced epoxy resin.

10. The connecting rod according to claim 1, wherein the grooves that form a continuous groove enclosing the connecting rod are provided in the shank of the connecting rod.

11. The connecting rod according to claim 1, wherein the eyes are an integral part of the connecting rod.

12. The connecting rod according to claim 1, wherein the casing is formed by a tube-like woven fabric of the at least one of reinforcing fibres or reinforcing strands.

13. The connecting rod according to claim 1, wherein the casing is formed by endless reinforcing fibres or endless reinforcing fibre strands.

* * * * *